(12) United States Patent
Tokita et al.

(10) Patent No.: US 6,692,023 B2
(45) Date of Patent: Feb. 17, 2004

(54) AIR BAG APPARATUS OF MOTOR VEHICLE

(75) Inventors: Katsuhiro Tokita, Fuji (JP); Tetsuji Endo, Fuji (JP); Masami Tonooka, Fuji (JP); Yasuhiro Uchida, Fuji (JP)

(73) Assignee: Nihon Plast Co., Ltd. (JP)

( * ) Notice: Subject to any disclaimer, the term of this patent is extended or adjusted under 35 U.S.C. 154(b) by 66 days.

(21) Appl. No.: 09/965,928

(22) Filed: Sep. 28, 2001

(65) Prior Publication Data

US 2002/0036401 A1 Mar. 28, 2002

(30) Foreign Application Priority Data

Sep. 28, 2000 (JP) ........................................ 2000-297406

(51) Int. Cl.[7] ............................................... B60R 21/16
(52) U.S. Cl. ................................. 280/743.1; 280/743.2
(58) Field of Search .................................. 280/732, 733, 280/743.1, 743.2

(56) References Cited

U.S. PATENT DOCUMENTS

| | | | | |
|---|---|---|---|---|
| 5,186,489 A | * | 2/1993 | Imai | 280/728.2 |
| 5,316,337 A | * | 5/1994 | Yamaji et al. | 280/743.1 |
| 5,489,119 A | * | 2/1996 | Prescaro et al. | 280/743.2 |
| 5,520,413 A | * | 5/1996 | Mossi et al. | 280/729 |
| 5,669,632 A | * | 9/1997 | Johnson et al. | 280/743.2 |
| 5,813,696 A | * | 9/1998 | Hill | 280/743.2 |
| 5,941,559 A | * | 8/1999 | Rudolf et al. | 280/729 |
| 5,997,037 A | * | 12/1999 | Hill et al. | 280/743.2 |
| 6,390,501 B1 | * | 5/2002 | Greib et al. | 280/743.2 |
| 6,439,606 B2 | * | 8/2002 | Okada et al. | 280/743.1 |
| 6,450,300 B1 | * | 9/2002 | Kramer | 188/1.11 L |
| 6,502,858 B2 | * | 1/2003 | Amamori | 280/743.2 |
| 6,523,855 B2 | * | 2/2003 | Musiol et al. | 280/729 |

FOREIGN PATENT DOCUMENTS

JP    11-5505    12/1998

* cited by examiner

Primary Examiner—Paul N. Dickson
Assistant Examiner—Toan C To
(74) Attorney, Agent, or Firm—Kilpatrick Stockton LLP

(57) ABSTRACT

The invention provides an air bag apparatus of a motor vehicle which can securely protect a passenger in a much close state by an inexpensive means. Since a rear end (a patch portion (19)) of a tether belt (20) is positioned at a vertical surface (A) passing through a rear end (21) of an instrument panel (1) or in a front side thereof, in an initial expanding state of an air bag (4), a rearward development of the air bag (4) is restricted just before a passenger (M) due to a tension of the tether belt (20) even in the case that the passenger (M) stands close to the instrument panel (1), whereby no excessive impact is applied to the passenger (M).

3 Claims, 7 Drawing Sheets

AIR BAG APPARATUS OF MOTOR VEHICLE

BACKGROUND OF THE INVENTION

1. Field of the Invention

The present invention relates to an air bag apparatus of a vehicle, and more particularly to an air bag apparatus for a front passenger.

2. Description of the Related Art

An air bag apparatus for a front passenger of the motor vehicle Is structured such that an air bag is received in a folded state in an instrument panel positioned below of a front window panel. The air bag is structured such as to expand due to a gas injected out from an inflator at a time of collision, develop toward an inner side of a passenger's room from an upper portion of the instrument panel and receive the passenger falling forward so as to protect the passenger.

A tether belt extending in a longitudinal direction from a gas introduction port of an air bag to a portion close to a rear end is provided in an inner portion of the air bag used in this kind of air bag apparatus, for example, as is known in Japanese Patent Application Laid-open No. 11-5505. The tether belt has a function of guiding a gas stream output from the gas introduction port to the rear end side of the air bag in an initial expanding state of the air bag, and a function of restricting a linear development of the air bag to an inner side of the passenger's room and developing so as to extend in a vertical direction.

SUMMARY OF THE INVENTION

However, in the prior art mentioned above, the tether belt is long and the rear end of the tether belt is positioned in the passenger compartment disposed beyond the rear end of the instrument panel in the initial expanding state of the air bag. Accordingly, in the case of a normal state in which the front passenger existing in the front passenger's seat is sufficiently apart from the instrument panel, the air bag in the initial expanding state expands upward and downward with being restricted to develop rearward by the tether belt before reaching to the passenger mentioned above, however, in the case that the passenger is much close to the instrument panel, the rear end of the air bag is brought into contact with the passenger before expanding upward and downward at a stage of the initial expansion, so that there is a risk that an excessive impact is applied to the passenger.

In order to prevent the excessive impact from being applied to the passenger in the latter state, it is necessary to provide with a rotating mechanism for changing a developing direction of the air bag and a sensor for detecting an approaching state that is out of usual position. Then, the structure is made such that a developing angle of the air bag is changed to a direction in which the excessive impact is not applied to the passenger, at a time of detecting the approaching state by the sensor, however, according to this countermeasure, a cost is significantly increased.

The present invention has been made in consideration of the prior art mentioned above, and an object of the present invention is to provide an air bag apparatus for a motor vehicle which can securely protect a passenger even in an approaching state without significantly increasing a cost.

According to a first technical aspect of the present invention, there is provided an air bag for a vehicle having a front portion including a gas introduction port introducing an inflation gas therethrough wherein the air bag is placed at a predetermined position of the vehicle interior with respect to the gas introduction port and develops rearward due to a motivation, a tether belt connecting the gas introduction port and a rear portion at an upper side of the air bag, wherein a rear end portion of the tether belt extending in an initial developing stage of the air bag toward a vertical surface passing a rear end of an instrument panel of the vehicle is positioned in the surface.

According to a second technical aspect of the present invention, a length of the tether belt is equal to or less than a horizontal distance between the gas introduction port and the vertical surface.

According to a third technical aspect of the present invention, a front end of the tether belt is connected to a rear edge of the gas introduction port.

According to a fourth technical aspect of the present invention, the rear end of the tether belt is connected to a portion forming an upper surface portion of the air bag.

According to a fifth technical aspect of the present invention, the tether belt is provided with a front side belt a front end of which is connected to the gas introduction port, and a rear side belt connected to another end of the front side belt and having a middle portion connected to an upper side of the air bag so as to constitute a patch portion having a predetermined area and two end portions both connected to another end of the front side belt.

According to a sixth technical aspect of the present invention, the tether belt is provided with a front side belt having two end portions and a middle portion of which is connected to the gas introduction port so as to constitute a patch portion having a predetermined area, and a rear side belt connected to another end of the front side belt and having a middle portion connected to an upper side of the air bag so as to constitute a patch portion and two end portions both connected to both ends of the front side belt. Accordingly, since the front side belt is also constituted by a two-sheet structure, a strength of the tether belt is improved, and the gas introduction port is reinforced by the patch portion of the front side belt.

According to a seventh technical aspect of the present invention, the air bag is formed in a bag shape by connecting a lower base fabric and an upper base fabric, the gas introduction port is provided in a front portion of the lower base fabric, one end of the tether belt is connected to the upper base fabric, the tether belt has one front side belt in which a front end of the lower base fabric is connected to the gas introduction port and a rear side belt a middle portion of which is connected to the upper base fabric so as to constitute a patch portion having a predetermined area, and both end portions of the rear side belt are connected to a rear end of the front side belt.

DESCRIPTION OF THE PREFERRED EMBODIMENT

A description will be given below of preferred embodiments according to the present invention with reference to the accompanying drawings.

Figure 3:
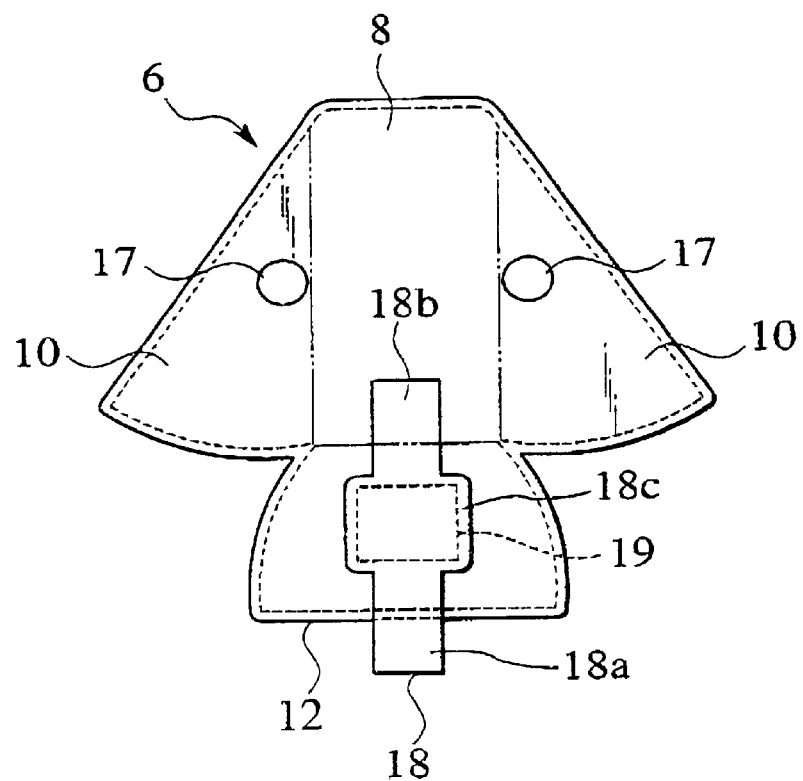
FIG. 3 is a plan view showing an upper base fabric of the air bag shown in FIG. 1.
Figure 4:
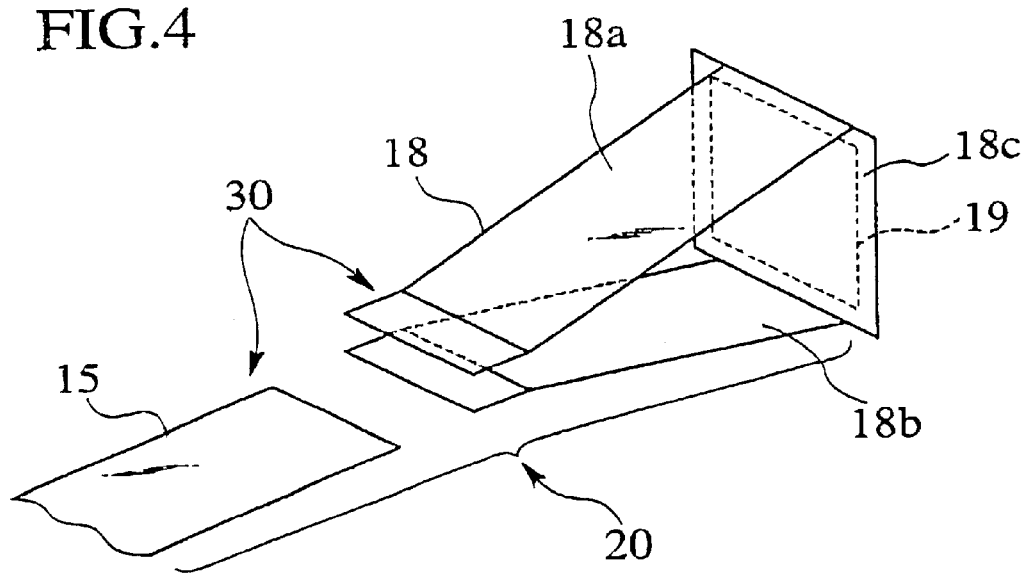
FIG. 4 is a perspective view showing a tether belt constituted by a front side belt and a rear side belt shown in FIG. 1.
Figure 5:
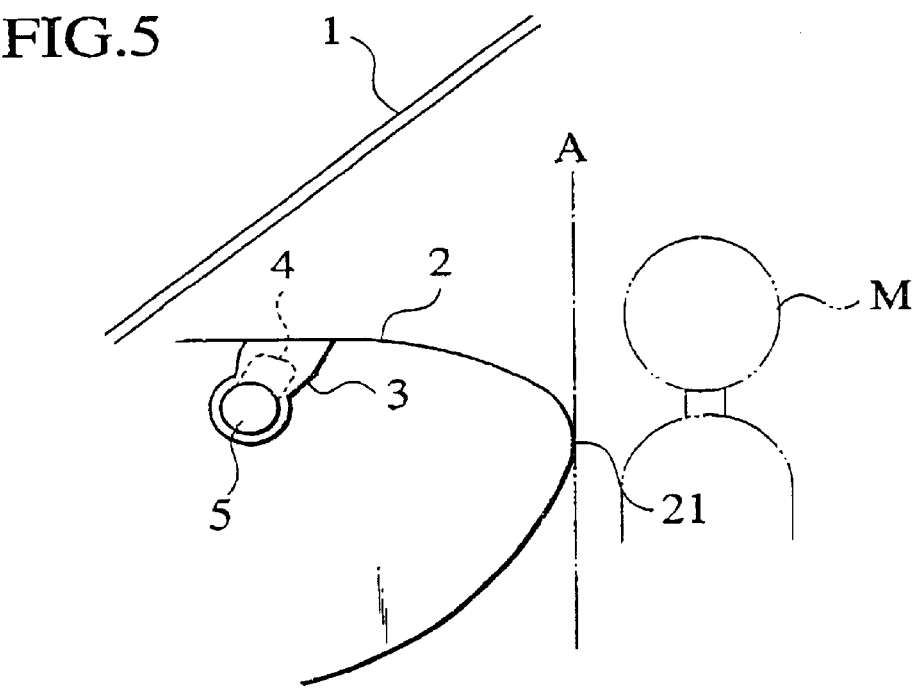
FIG. 5 is a side view of a passenger compartment showing a state that a passenger stands close to an instrument panel.

FIGS. 1 to 8 are views showing a first embodiment according to the present invention. At first, as shown in FIG. 5, an instrument panel 2 is positioned below a front window panel 1 in an assistant driver's seat side of a motor vehicle. A case 3 closed by a lid (not shown) is provided in an upper portion of the instrument panel 2, and an air bag 4 in a folded state and an inflator 5 injecting a gas for inflating the bag are received within the case 3.

Figure 1:
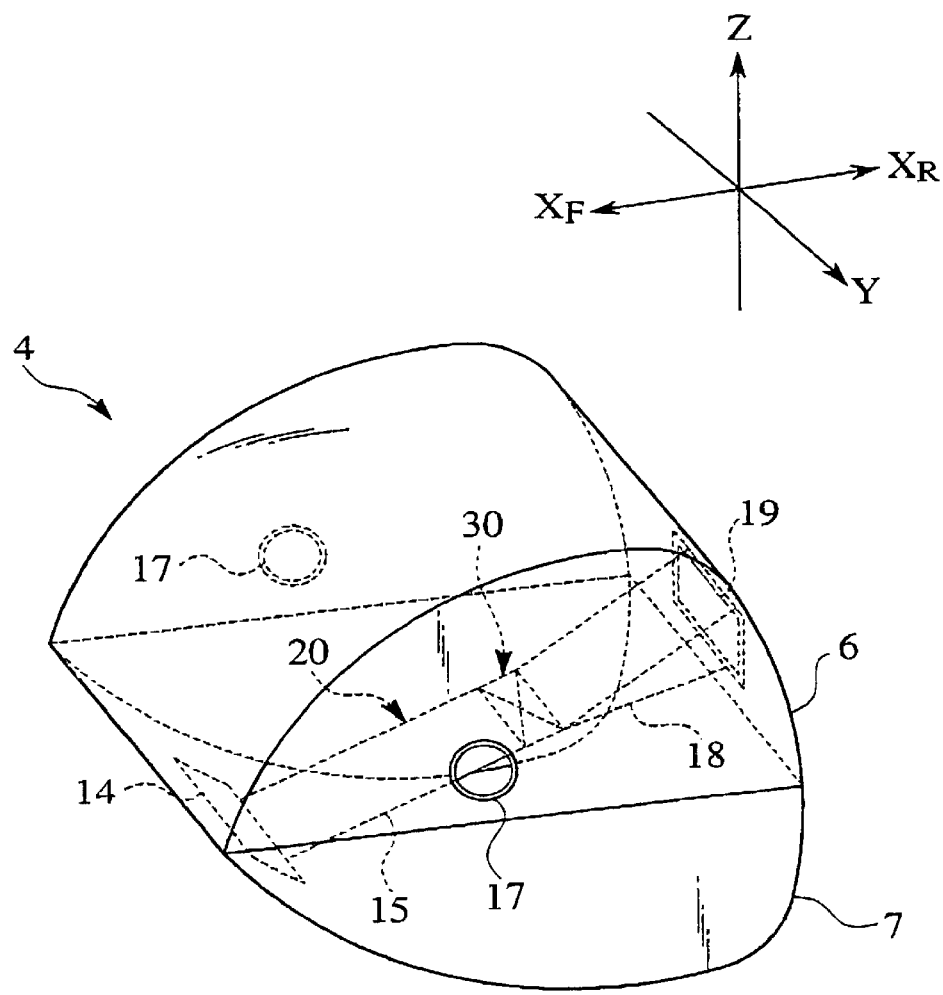
FIG. 1 is a perspective view showing an air bag according to a first embodiment of the present invention.
Figure 2:
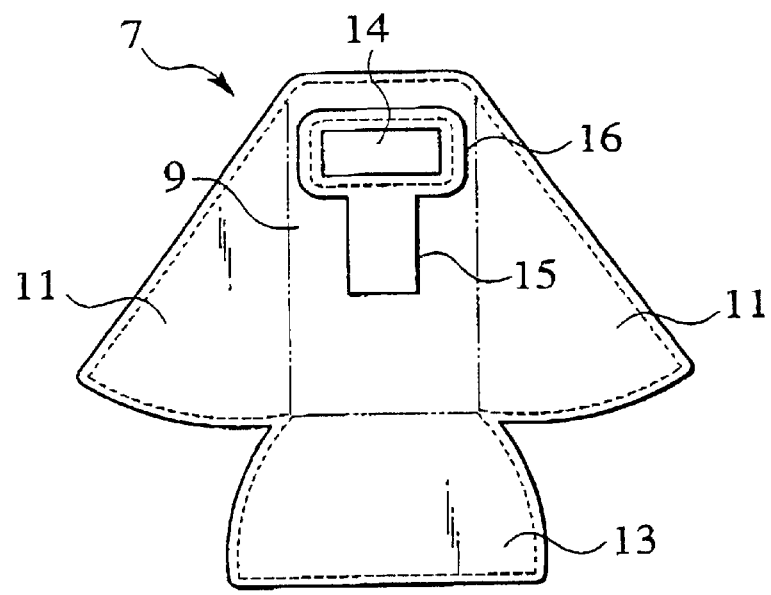
FIG. 2 is a plan view showing a lower base fabric of the air bag shown in FIG. 1.

The air bag 4 is constituted by two fabrics such as upper base fabric 6 and a lower base fabric 7 which are made of non-coated nylon 66 woven cloth having a weight (weight per area) of 200 g/m$^2$. The upper base fabric 6 and the lower base fabric 7 are, as shown in FIGS. 2 and 3, both formed in a symmetrical shape, the upper base fabric 6 has an upper portion 8 forming an upper surface portion of the expanding air bag 4, and the lower base fabric 7 has a lower portion 9 forming a lower surface portion of the expanding air bag 4. Substantially triangular side portions 10 and 11 forming side surface portions of the expanding air bag 4 are formed in both right and left sides of the upper portion 8 in the upper base fabric 6 and the lower portion 9 in the lower base fabric 7, and rear portions 12 and 13 forming a rear surface portion receiving a passenger are integrally provided in rear sides thereof. A rectangular gas introduction port 14 is formed in a front end of the lower base fabric 7, a front end 16 of a front side belt 15 having the same opening as the gas introduction port 14 is superposed and sewed up in the periphery of the gas introduction port 14, and a main body of the front side belt 15 is in a state of extending toward a rear side from a rear edge of the gas introduction port 14. The gas introduction port 14 is reinforced by sewing up the front end 16 of the front side belt 15 in the periphery thereof.

Further, a vent hole 17 is formed in each of the left and right side portions 10 in the upper base fabric 6. The vent hole 17 is provided so as to release an extra gas at a time when the air bag 4 is completely expanded. Further, a peripheral edge of a patch portion 19 having a rectangular shape or a circular shape with a vertical width of 150 mm and a lateral width of 160 mm is sewed up in a center portion 18c of a rear side belt 18 in the rear portion 12 of the upper base fabric 6. Accordingly, the rear side belt is structured such as to be provided with an upper band portion 18a and a lower band portion 18b. In this case, the rear side belt 18 may be constituted by a plurality of members.

In the lower base fabric 7 and the upper base fabric 6, at first, the corresponding side portions 10 and 11 and the edge portions of the rear portions 12 and 13 are sewed up with each other in a state of facing back surfaces in which the front side belt 15 and the rear side belt 18 are positioned in a front surface side to each other. Next, the opposing peripheral edge portions of the lower base fabric 7 and the upper base fabric 6 are sewed up with each other. Then, as shown in FIG. 4, the lower base fabric 7 and the upper base fabric 6 which are sewed up with each other are bent, the front side belt 15 and the rear side belt 18 are moved close to each other, and the rear end of the front side belt 15 and both ends of the rear side belt 18 which are positioned in back and front sides in this state are sewed up, whereby a tether belt 20 is formed. Finally, when reversing the lower base fabric 7 and the upper base fabric 6 from the gas introduction port 14, the tether belt 20 is positioned in an inner portion and the air bag 4 in which a peripheral seam is invisible is completed. The completed air bag 4 becomes in a state that the gas introduction port 14 at the front portion of the lower base fabric 7 and the rear portion 12 of the upper base fabric 6 are connected therewithin by the tether belt 20.

The air bag 4 formed in the manner mentioned above is received within the case 3 in the upper portion of the instrument panel 2 in a state of being folded as mentioned above, and the gas introduction port 14 is connected to the inflator 5. A length of the tether belt 20 provided in the inner portion of the air bag 4 is shorter than the conventional one, and if the tether belt 20 is horizontally extended to a rear side in a static state in a state of being assembled in the instrument panel 2, the structure is made such that a rear end (a patch portion 19) substantially coincides with a vertical surface A passing through a rear end 21 of the instrument panel 2. Otherwise, the rear end may be disposed in front of the vertical surface A. That is, one feature of the present invention is that the air bag is developed so that the expanding surface of the air bag does not directly hit a passenger at an initial expanding stage of the air bag.

Next, a description will be given of an actual developing motion of the air bag 4 with reference to FIGS. 5 to 8.

First Stage

FIG. 5 shows a state that a passenger M stands close to the instrument panel 2. In this state, when an impact force is generated due to a collision, a falling or the like of the motor vehicle, the impact force is detected so as to motivate an operation of the air bag. The gas generated in the inflator 5 is discharged within the air bag 4 from the gas introduction port 14, and the air bag 4 is expanded. Since the front side belt 15 of the tether belt 20 extends from the rear edge of the gas introduction port 14, the gas introduction port 14 is not closed by the front side belt 15, a smooth inflow of the gas from the gas introduction port 14 is executed and a developing speed of the air bag 4 becomes faster.

Figure 6:
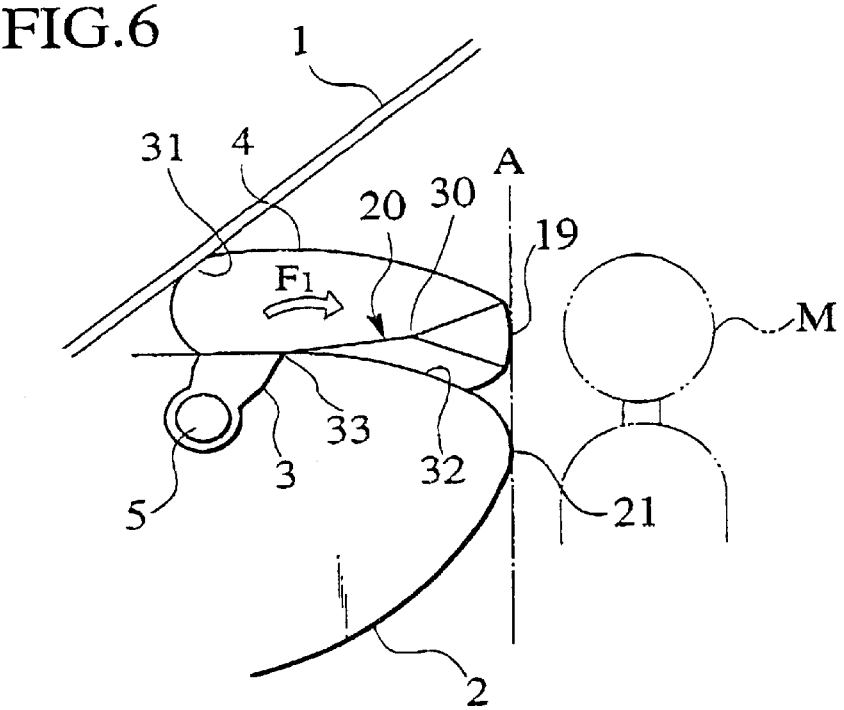
FIG. 6 is a side view of the passenger compartment showing an initial expanding state of the air bag shown in FIG. 5.

The expanding air bag 4 jumps out from the case 3 as shown in FIG. 6, then the air bag is brought into contact with a part 31 of a front window panel 1 and thereafter develops rearward as an initial expansion due to a jet flow F1. At this time, the length of the tether belt 20 within the air bag 4 is defined as a length just reaching the vertical surface A passing through the rear end 21 of the instrument panel 2. Accordingly, the tether belt 20 tends to extend at an upward angle in the initial expanding state, and the rear end of the tether belt 20 does not exceed the vertical surface A.

Additionally, the rear side belt is structured such that the upper band portion 18a, the lower band portion 18b and the patch portion 19 form a substantially triangular tube structure around a sewing portion 30 corresponding to a supporting point, and a distance from a rear edge portion 33 of the gas introduction port 14 is defined together with the front side belt 15, therefore it is possible to restrict a rearward protrusion of a whole of the patch portion at the initial expanding stage. And a gas stream (localized pressure) passing through a portion near a surface of the upper band portion 18a and the lower band portion 18b assists an orientation change of the triangular tube structure together with the support at the contact surface 31 between the front window panel 1 and the upper base fabric 6, thereby the surface of the patch portion 19 is securely directed rearward due to a rotating function performed by the air bag 4 of the present embodiment. In particular, a downward force applied by the gas stream passing though the upper side of the upper band portion 18a has an effect of modifying an attitude of the tether belt having a tendency of extending at an upward angle in the initial expanding state.

Accordingly, in the case that the passenger M is significantly close to the instrument panel 2, a rearward development of the air bag 4 is restricted by a position just before the passenger M due to a tension of the tether belt 20 and no excessive impact is applied to the passenger M. Furthermore, since the patch portion 19 corresponding to a damping surface is securely directed rearward by the rear side belt structure even when the rearward development is restricted, it is possible to stably hold the passenger M. In particular, in this embodiment, since the rear end of the tether belt 20 is connected to the upper base fabric 6 so as to constitute the patch portion 19 having a predetermined area, a bonding force between the tether belt 20 and the upper base fabric 6 is strong, thereby sufficiently receiving the impact force applied at a time when the patch portion 19 reaches the portion near the vertical surface A, therefore it is possible to securely restrict the rearward development of the air bag 4. Further, since the tether belt 20 is inexpensive, it is possible to significantly reduce a manufacturing cost.

Second Stage

Figure 7:
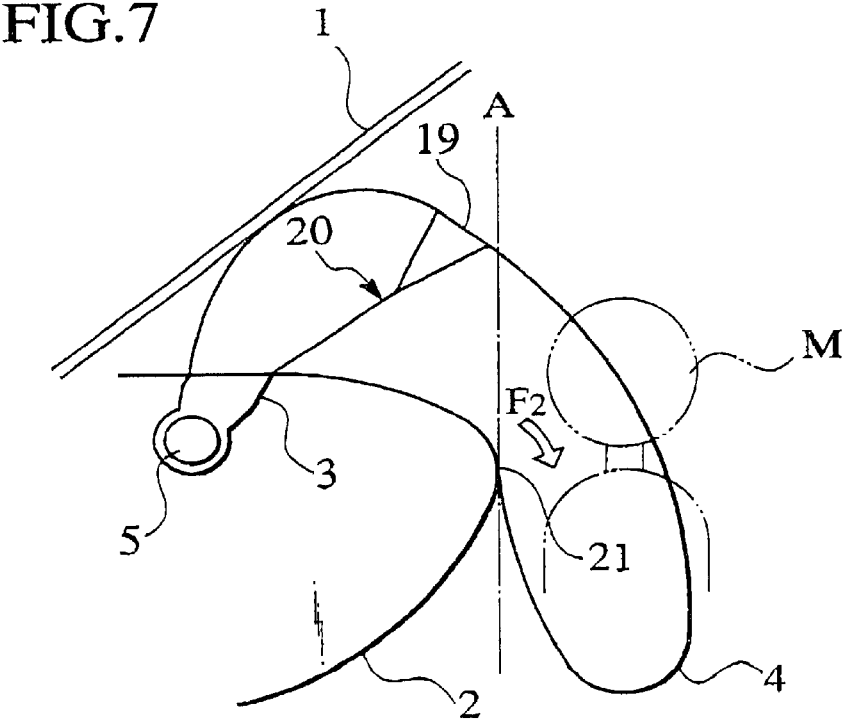
FIG. 7 is a side view of the passenger compartment showing a state that the air bag shown in FIG. 6 develops downward.

The air bag 4 develops downward as shown in FIG. 7 after the initial expansion due to additional supply of gas from the inflator in such a way that the air bag enters between the instrument panel 2 and the passenger M. In the manner mentioned above, the air bag 4 develops downward because the rear end of the tether belt 20 is connected to the upper base fabric 6 of the air bag 4; a lower capacity of the tether belt 20 is larger than an upper capacity at the rear end of the air bag 4, and the gas flow received by the patch portion 19 and/or the center portion 18c of the rear side belt 18 in the first stage is changed downward whereby the portion below the tether belt 20 mainly expands.

Third Stage

Figure 8:
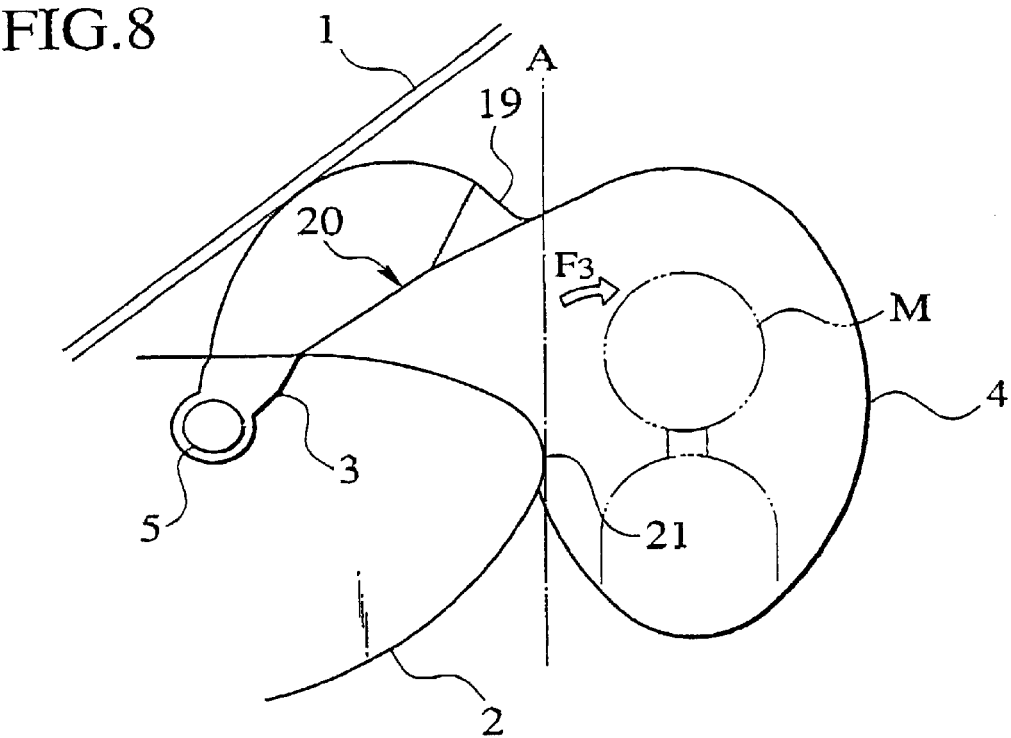
FIG. 8 is a side view of the passenger compartment showing a final developing state of the air bag shown in FIG. 7.

The air bag 4 develops upward as shown in FIG. 8 after developing downward according to additional supply of gas from the inflator, and it is possible to securely protect both of a head portion and a body portion of the passenger M. Since the tether belt 20 according to this embodiment is connected to the gas introduction port 14 via one front side belt 15, a tension applied to the upper base fabric 6 of the air bag 4 from the tether belt 20 is transmitted on the basis of one system, so that it is possible to obtain a stable developing motion of the air bag 4. That is, if two tether belts 20 are provided and the tension is transmitted to the air bag 4 on the basis of two systems, a mechanical interaction is applied between the tether belts, then the tension transmitted to the air bag 4 becomes unstable in some conditions of two tether belts 20 and there is a risk that the air bag 4 vertically swings and the motion is not uniformly defined. According to the present embodiment, such a problem does not occur in the third stage.

Fourth Stage

When the air bag 4 completely expands, a surplus gas is released from the vent holes 17. Since the vent holes 17 are formed in the side portions 10 and 11 except the area receiving the passenger, there is no risk that the vent holes 17 are closed by the passenger. The tether belt 20 itself does not extend rearward from the vertical surface A, however, the air bag 4 at the lower portion than the tether belt 20 develops sufficiently rearward than the vertical surface A, and it is possible to securely protect the passenger M at a normal position who does not stands close to the instrument panel 2 by the air bag 4.

According to the present embodiment, since the rear end of the tether belt is positioned at the vertical surface passing through the rear end of the instrument panel or in front thereof, in the initial expanding state of the air bag, the rearward development of the air bag is restricted just before the passenger due to the tension of the tether belt even in the case that the passenger stands close to the instrument panel, and no excessive impact is applied to the passenger. That is, it is possible to execute by the inexpensive means. Since the rear end of the tether belt is connected to the upper side of the air bag, the air bag develops in a direction of expanding downward after the initial expansion, and it is possible to securely receive the head portion and the body portion of the passenger so as to protect them.

Second Embodiment

Figure 9:
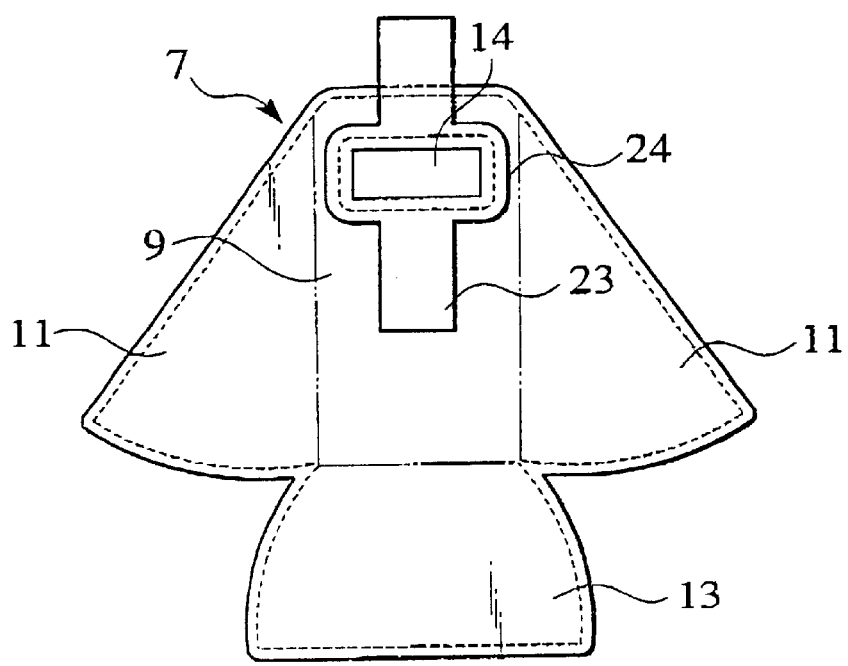
FIG. 9 is a plan view showing a lower base fabric according to a second embodiment.
Figure 10:
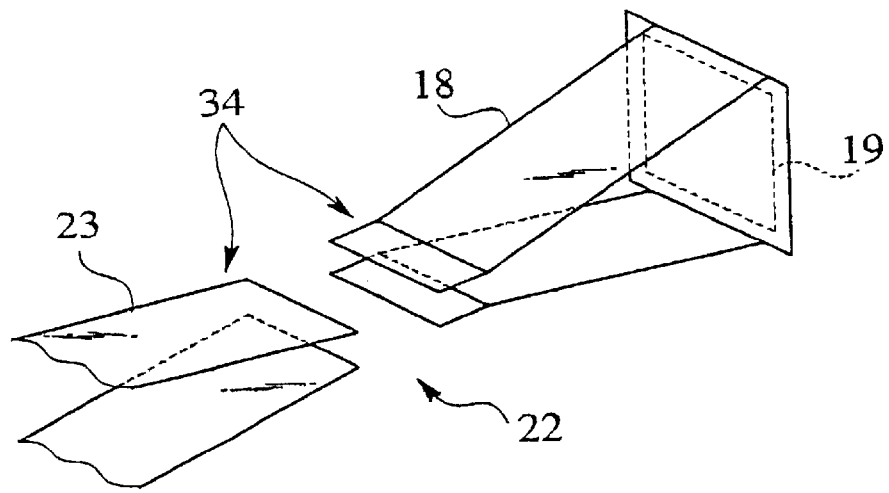
FIG. 10 is a perspective view showing a tether belt constituted by a front side belt and a rear side belt according to the second embodiment.

FIGS. 9 and 10 are views showing a second embodiment according to the present invention. In a tether belt 22 according to the present embodiment, a front side belt 23 also forms a patch portion 24 having an opening corresponding to the gas introduction port 14 in a center portion thereof, and the patch portion 24 is sewed up in the periphery of the gas introduction port 14. The gas introduction port 14 is reinforced by sewing up the patch portion 24 in the periphery thereof, so as to securely prevent the gas introduction port 14 from being broken due to impact of the gas caused by jet flow from the inflator. Further, both ends of the front side belt 23 and the rear side belt 18 are connected to each other.

According to the second embodiment, the front side belt 23 is also made in a two-sheet structure, and strength of the tether belt 22 is improved. Although both of the front side belt 23 and the rear side belt 18 are made in a two-sheet structure, they are sewed up as a one-sheet member obtained by overlapping both ends with each other and have flexibility for bending in a vertical direction (Z), thereby the tension is transmitted by the tether belt 22 on the basis of substantially one system, as a result, a stable developing motion of the air bag can be obtained. The front side belt 23 extending from the front edge of the gas introduction port 14 extends in a direction of closing the gas introduction port 14, however, both right and left sides of the gas introduction port 14 are open, and there is no problem in view of an inflow performance of the gas.

Third Embodiment

Figure 11:
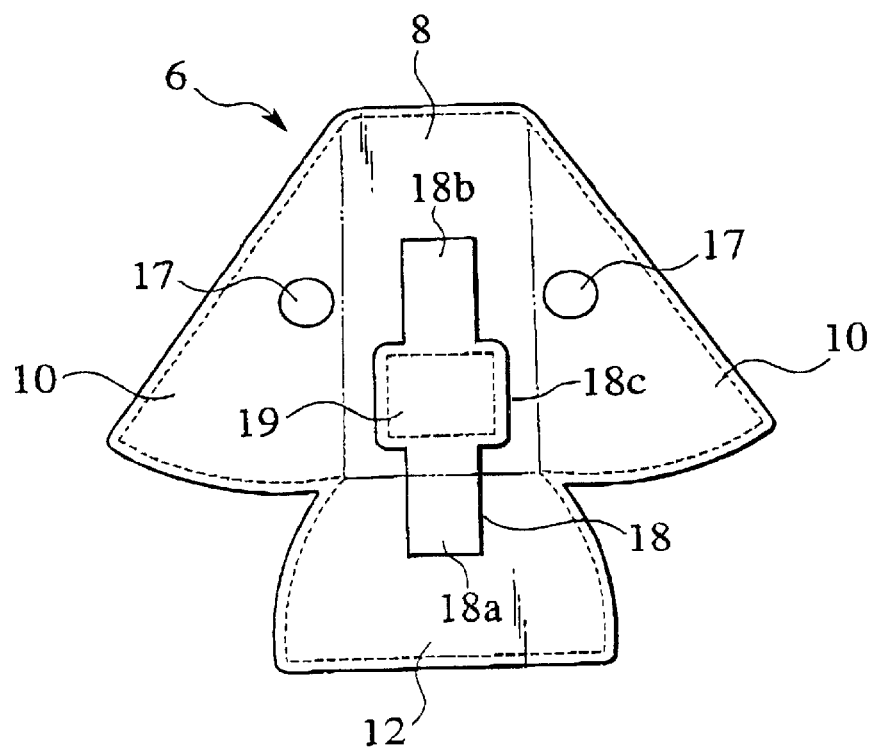
FIG. 11 is a plan view showing an upper base fabric of an air bag according to a third embodiment.
Figure 12:
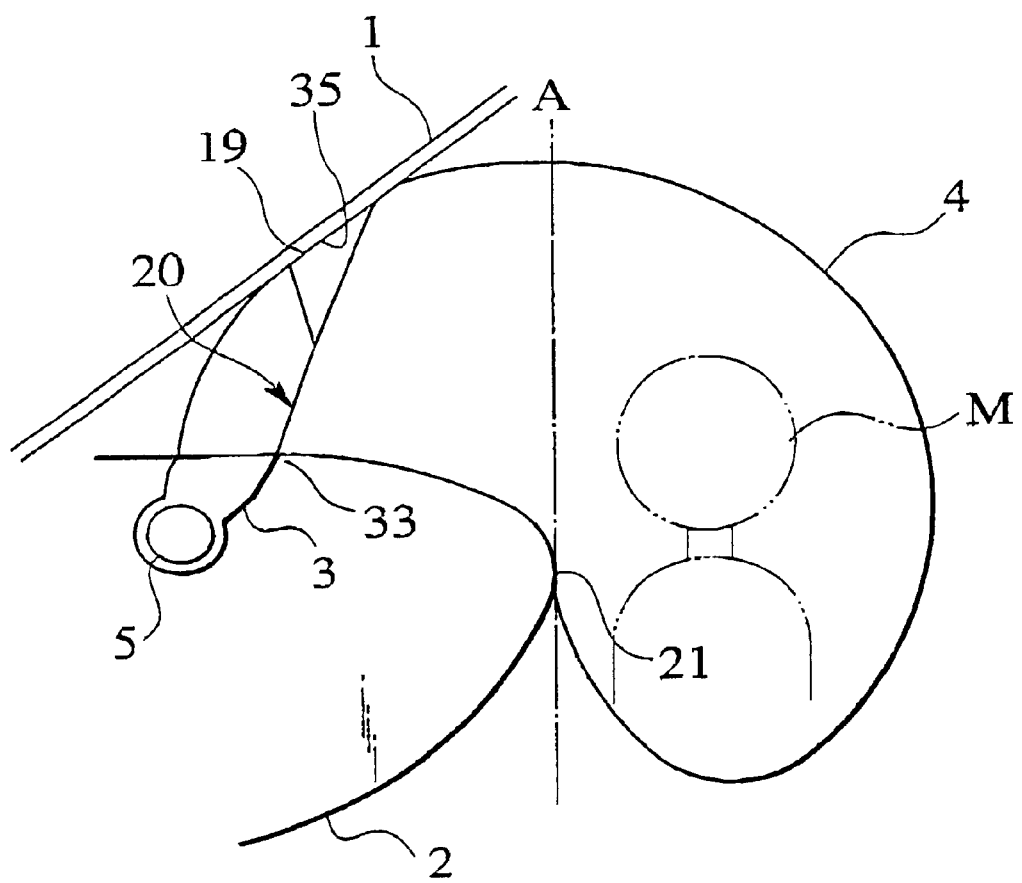
FIG. 12 is a side view of a passenger compartment showing a final developing state of the air bag according to the third embodiment.

FIGS. 11 and 12 are views showing a third embodiment according to the present invention. According to the present embodiment, the structure is made such that the patch portion 19 of the rear side belt 18 is connected to the upper portion 8 of the upper base fabric 6. According to this third embodiment, the patch portion 19 corresponding to the rear end of the tether belt 20 is connected to the upper portion 8 of the upper base fabric 6, and an operation at the initial expanding time is the same as that of the case of the preceding embodiment, however, the patch portion 19 of the tether belt 20 is in a state of being pressed to the front window panel 1 in a state that the air bag 4 finally expands, then a final state of the air bag 4 becomes more stable. That is, since the tether belt 20 defines a distance from a rear edge portion 33 of the gas introduction port 14, a contact position 35 with respect to the front window panel 1 is necessarily determined. Furthermore, the rear portion 12 of the upper base fabric 6 and the lower base fabric 7 integrally constitute a shape of the rear portion of the air bag, and then a final shape of the air bag 4 after the third stage becomes stable In all of the embodiments mentioned above, the description is given of the air bag constituted by the two-sheet structure comprising the upper base fabric 6 and the lower base fabric 7, however, the structure is not limited to this, and the air bag may be constituted by three or more base fabrics.

According to the present invention, since the rear end of the tether belt is positioned at the vertical surface passing through the rear end of the instrument panel or in front of the vertical surface, in the initial expanding state of the air bag, the rearward development of the air bag is restricted just before the passenger due to the tension of the tether belt even in the case that the passenger stands close to the instrument panel, and the means for preventing the excessive impact from being applied to the passenger can be made significantly inexpensive. Since the rear end of the tether belt is connected to the upper base fabric of the air bag, the air bag develops in the direction of expanding downward after the initial expansion, thereby it is possible to securely receive the head portion and the body portion of the passenger so as to protect them.

This application claims benefit of priority under 35USC §119 to Japanese Patent Applications No. 2000-297406, filed on Sep. 28, 2000, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An air bag for a vehicle comprising:
   a front portion having a gas introduction port introducing an inflation gas therethrough wherein said air bag is placed at a predetermined position of the vehicle interior with respect to the gas introduction port and develops rearward due to a motivation; and
   a tether belt connecting the gas introduction port and a rear portion at an upper side of the air bag, wherein the tether belt includes a front side belt, a front end of the front side belt being connected to the gas introduction port, and a rear side belt connected to another end of the front side belt, the rear side belt having a middle portion connected to an upper side of the air bag so as to constitute a patch portion having a predetermined area and two end portions both connected to another end of the front side belt, and wherein a rear end portion of the tether belt extending in an initial developing state of the air bag toward a vertical surface passing a rear end of an instrument panel of the vehicle is positioned in the surface or front side thereof.

2. An air bag for a vehicle comprising:
   a front portion having a gas introduction port introducing an inflation gas therethrough wherein said air bag is placed at a predetermined position of the vehicle interior with respect to the gas introduction port and develops rearward due to a motivation; and
   a tether belt connecting the gas introduction port and a rear portion at an upper side of the air bag, wherein the tether belt includes a front side belt having two end portions, a middle portion of the front side belt being connected to the gas introduction port so as to constitute a patch portion having a predetermined area, and a rear side belt connected to another end of the front side belt having a middle portion connected to an upper side of the air bag so as to constitute a patch portion and two end portions both connected to both ends of the front side belt at one portion, and wherein a rear end portion of the tether belt extending in an initial developing state of the air bag toward a vertical surface passing a rear end of an instrument panel of the vehicle is positioned in the surface or front side thereof.

3. An air bag for a vehicle comprising:
   a front portion having a gas introduction port introducing an inflation gas therethrough wherein said air bag is placed at a predetermined position of the vehicle interior with respect to the gas introduction port and develops rearward due to a motivation; and
   a tether belt connecting the gas introduction port and a rear portion at an upper side of the air bag, wherein
      a rear end portion of the tether belt extending in an initial developing state of the air bag toward a vertical surface passing a rear end of an instrument panel of the vehicle is positioned in the surface or front side thereof, wherein
      the air bag is formed in a bag shape by connecting a lower base fabric and an upper base fabric;
      the gas introduction port is provided in a front portion of the lower base fabric;
      one end of the tether belt is connected to the upper base fabric;
      the tether belt has one front side belt in which a front end of the lower base fabric is connected to the gas introduction port and a rear side belt a middle portion of which is connected to the upper base fabric so as to constitute a patch portion having a predetermined area; and
      both end portions of the rear side belt are connected to a rear end of the front side belt.

* * * * *